US006728321B2

(12) United States Patent
Neubauer et al.

(10) Patent No.: US 6,728,321 B2
(45) Date of Patent: Apr. 27, 2004

(54) RECEIVING DEVICE FOR ANGLE-MODULATED SIGNALS

(75) Inventors: André Neubauer, Krefeld (DE); Dieter Brückmann, Meerbusch (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/174,072

(22) Filed: Jun. 17, 2002

(65) Prior Publication Data

US 2002/0176517 A1 Nov. 28, 2002

Related U.S. Application Data

(63) Continuation of application No. PCT/DE00/04494, filed on Dec. 13, 2000.

(30) Foreign Application Priority Data

Dec. 15, 1999  (DE) .......................................... 199 60 559

(51) Int. Cl.$^7$ ................................................ H04L 27/22
(52) U.S. Cl. ..................................... 375/322; 455/179.1
(58) Field of Search .............................. 375/322, 324, 375/328, 334; 455/207, 313, 314, 323, 179.1; 329/300, 302, 345, 346

(56) References Cited

U.S. PATENT DOCUMENTS

| 5,230,011 A | | 7/1993 | Gielis et al. | |
|---|---|---|---|---|
| 5,247,515 A | | 9/1993 | White | |
| 5,659,546 A | * | 8/1997 | Elder | 370/343 |
| 5,915,028 A | * | 6/1999 | Chahabadi | 381/15 |
| 5,926,513 A | * | 7/1999 | Suominen et al. | 375/346 |
| 6,218,972 B1 | * | 4/2001 | Groshong | 341/143 |
| 6,307,897 B1 | * | 10/2001 | Ohta et al. | 375/316 |
| 6,393,067 B1 | * | 5/2002 | Uesugi | 375/316 |

FOREIGN PATENT DOCUMENTS

| DE | 12 75 589 C2 | 8/1968 |
|---|---|---|
| DE | 37 33 967 C2 | 4/1989 |
| DE | 41 04 882 A1 | 8/1992 |
| DE | 42 19 417 C2 | 12/1993 |
| DE | 42 37 692 C1 | 3/1994 |
| DE | 43 28 497 C1 | 1/1995 |
| DE | 195 36 527 C2 | 4/1997 |
| DE | 198 02 373 C1 | 6/1999 |
| EP | 0 123 278 A1 | 10/1984 |
| EP | 0 486 095 A1 | 5/1992 |
| EP | 0 632 577 A1 | 1/1995 |
| EP | 0 795 984 A2 | 9/1997 |
| EP | 0 858 157 A2 | 8/1998 |
| EP | 0 858 179 A1 | 8/1998 |
| WO | WO 99/30427 | 6/1999 |
| WO | WO 99/30428 | 6/1999 |

OTHER PUBLICATIONS

Aoyama, T. et al.: "120–Channel Transmultiplexer Design and Performance", IEEE, vol. COM–28, No. 9, Sep. 1980, 1709–1716.

* cited by examiner

Primary Examiner—Amanda T. Le
(74) Attorney, Agent, or Firm—Laurence A. Greenberg; Werner H. Stemer; Ralph E. Locher

(57) ABSTRACT

A receiving device for angle-modulated signals performs the channel selection in a digital manner rather than an analog manner. A receive signal is preferably initially converted to an intermediate frequency band, filtered and A/D converted. The receive signal is subsequently converted to the baseband and channels are selected in a digital manner through the use of a digital complex multiplier before the receive signal component of the selected transmission channel is demodulated and the corresponding symbols are detected through the use of a differential demodulator.

21 Claims, 2 Drawing Sheets

RECEIVING DEVICE FOR ANGLE-MODULATED SIGNALS

CROSS-REFERENCE TO RELATED APPLICATION

This application is a continuation of copending International Application No. PCT/DE00/04494, filed Dec. 13, 2000, which designated the United States and was not published in English.

BACKGROUND OF THE INVENTION

Field of the Invention

The present invention relates to a receiving device for angle-modulated signals, in particular a receiving device which also carries out a selection of a desired transmission channel.

In cordless digital communications systems, for example DECT (Digital Enhanced Cordless Telecommunications), WDCT (Worldwide Digital Cordless Telecommunications), Bluetooth, SWAP (Shared Wireless Access Protocol) or WLAN (Wireless Local Area Network) radio systems, suitable receivers are required for a wireless reception of the transmitted radio-frequency signals. The receivers must be suitable for processing the type of digital modulation which is used in the relevant communications system, wherein the invention also relates to the field of frequency modulation.

Along with high sensitivity, a high level of integration, low costs, low power consumption and flexibility in terms of applicability in different digital communications systems are required in this respect.

In cordless digital communications systems, superheterodyne receivers are currently often used to receive and demodulate angle-modulated signals. "Low-IF" (Intermediate Frequency) or "Zero-IF" (homodyne) receivers, which require no external filters to suppress mirror frequencies, are also increasingly used (for example in DECT mobile radio systems) to achieve high system integration and therefore lower system costs. Low-IF receivers use a relatively low intermediate frequency, which may, for example, be around 1 MHz in the case of input signal frequencies of around 2 GHz, whereas the intermediate frequency is 0 MHz in the case of zero-IF receivers. Analog FM (Frequency Modulation) demodulators based on the "limiter-discriminator" principle are currently used for demodulation in these receivers, whereby the baseband signal is initially reproduced and the transmitted symbols are subsequently detected using the baseband signal. The channel selection, i.e. the selection of the relevant required transmission channel of the receive signal, is carried out before the FM demodulation with the aid of analog filters, which filter out the unwanted frequency components or transmission channels. However, due to the analog circuit technology used in these receivers, these receivers are prone to the disadvantages associated with analog circuit technology, for example drift, ageing, temperature dependency, etc.

SUMMARY OF THE INVENTION

It is accordingly an object of the invention to provide a receiving device for angle-modulated signals which overcomes the above-mentioned disadvantages of the heretofore-known receiving devices of this general type and in which an effective channel selection and demodulation of an angle-modulated receive signal can be carried out.

With the foregoing and other objects in view there is provided, in accordance with the invention, a receiving device for angle-modulated signals, including:

- an analog/digital converter device for converting an angle-modulated receive signal into a digitized receive signal;
- a digital frequency conversion device provided downstream of the analog/digital converter device for converting the digitized receive signal into a baseband;
- a digital channel selection device provided downstream of the digital frequency conversion device for selecting a receive signal component of a given transmission channel from the digitized receive signal; and
- a digital demodulation device provided downstream of the digital channel selection device for demodulating the receive signal component selected by the digital channel selection device.

In other words, a receiving device for angle-modulated signals includes an analog/digital converter device provided for conversion of an angle-modulated receive signal into a digital signal, a digital frequency conversion device is provided downstream of the analog/digital converter device for conversion of the digitized receive signal into the baseband, a digital channel selection device is provided downstream of the digital frequency conversion device in order to select the receive signal component of a specific transmission channel from the digitized receive signal, and a digital demodulation device is provided downstream of the digital channel selection device for a demodulation of the selected receive signal component.

According to another feature of the invention, an analog frequency conversion device is provided upstream of the analog/digital converter device for converting the angle-modulated receive signal into an intermediate frequency band; and the digital frequency conversion device provided downstream of the analog/digital converter device is configured to convert the digitized receive signal from the intermediate frequency band into the baseband.

According to yet another feature of the invention, the analog frequency conversion device converts the angle-modulated receive signal having a carrier frequency into the intermediate frequency band having an intermediate frequency lower than the carrier frequency of the angle-modulated receive signal.

According to a further feature of the invention, the analog frequency conversion device converts the angle-modulated receive signal having a symbol rate into the intermediate frequency band having an intermediate frequency corresponding to the symbol rate of the angle-modulated receive signal.

According to another feature of the invention, the analog frequency conversion device converts the angle-modulated receive signal having a given channel spacing into the intermediate frequency band having an intermediate frequency corresponding to one half of the given channel spacing of the angle-modulated receive signal.

According to a further feature of the invention, a low-pass filter device is provided between the analog frequency conversion device and the analog/digital converter device for filtering the angle-modulated receive signal having been converted into the intermediate frequency band.

According to another feature of the invention, the analog/digital converter device, the digital frequency conversion device, and the digital channel selection device form a first signal processing path for processing an in-phase component of the angle-modulated receive signal and a second signal processing path for processing a quadrature component of the angle-modulated receive signal; and the digital demodulation device receives symbols output by the first signal processing path and symbols output by the second signal processing path for demodulation.

According to yet another feature of the invention, the analog/digital converter device includes a first analog/digital converter assigned to the first signal processing path, and a second analog/digital converter assigned to the second signal processing path; and the first analog/digital converter and the second analog/digital converter are configured as sigma-delta converters operating with oversampling.

According to an additional feature of the invention, the digital channel selection device includes a first digital channel selection unit assigned to the first signal processing path, and a second digital channel selection unit assigned to the second signal processing path.

According to another feature of the invention, the first and second channel selection units each have a multi-stage architecture with a plurality digital filters and with undersampling units provided alternately with the digital filters.

According to another feature of the invention, the first and second channel selection units each include a first digital filter, a first undersampling unit, a second digital filter, a second undersampling unit, a third digital filter and a third undersampling unit connected in series to one another.

According to a further feature of the invention, the first digital filter is a comb filter; the second digital filter is a bireciprocal lattice wave digital filter; and the third digital filter is a lattice wave digital filter.

According to another feature of the invention, the analog/digital converter device includes a first analog/digital converter assigned to the first signal processing path, and a second analog/digital converter assigned to the second signal processing path; the first analog/digital converter and the second analog/digital converter are configured as sigma-delta converters having a first filter order; and the first digital filter of the first and second digital channel selection units has a second filter order such that the second filter order is higher by a value of 1 than the first filter order.

According to another feature of the invention, the first and second analog/digital converters operate with a 32-fold oversampling; the first undersampling unit of the first and second channel selection units operates with an 8-fold undersampling; and the second and third undersampling units of the first and second channel selection units each operate with a 2-fold undersampling.

According to yet another feature of the invention, the first and second channel selection units each have an output side and each have an equalizer on the output side.

According to another feature of the invention, the digital filters of the first and second digital channel selection units are programmable digital filters with settable filter coefficients.

According to a further feature of the invention, the digital frequency conversion device is a digital complex multiplier.

According to yet a further feature of the invention, the digital complex multiplier is configured to access information stored in a table for performing a complex multiplication required for a frequency conversion into the baseband.

According to another feature of the invention, the digital complex multiplier is configured to apply a CORDIC (Coordinate Rotation Digital Computer) algorithm for performing a complex multiplication required for a frequency conversion into the baseband.

According to another feature of the invention, the analog/digital converter device, the digital frequency conversion device, and the digital channel selection device form a first signal processing path for processing an in-phase component of the angle-modulated receive signal and a second signal processing path for processing a quadrature component of the angle-modulated receive signal; the analog frequency conversion device includes a first frequency mixer assigned to the first signal processing path, and a second frequency mixer assigned to the second signal processing path; and the low-pass filter device includes a first low-pass filter assigned to the first signal processing path, and a second low-pass filter assigned to the second signal processing path.

According to yet another feature of the invention, the digital demodulation device includes a differential demodulator and a sign comparator provided downstream from the differential demodulator; and the differential demodulator outputs symbols, the sign comparator evaluates a sign of the symbols output by the differential demodulator in order to define a value of bits wherein the bits correspond to a selected one of the in-phase component of the receive signal and the quadrature component of the receive signal.

With the objects of the invention in view there is also provided, in a digital cordless communications system, a receiving device for angle-modulated signals, including:

an analog/digital converter device for converting an angle-modulated receive signal into a digitized receive signal;

a digital frequency conversion device provided downstream of the analog/digital converter device for converting the digitized receive signal into a baseband;

a digital channel selection device provided downstream of the digital frequency conversion device for selecting a receive signal component of a given transmission channel from the digitized receive signal; and a digital demodulation device provided downstream of the digital channel selection device for demodulating the receive signal component selected by the digital channel selection device.

According to another feature of the invention, the digital cordless communications system is configured to transmit GFSK-modulated signals and the receiving device is configured to receive GFSK-modulated signals.

With the objects of the invention in view there is also provided, a method of receiving angle-modulated signals, the method includes the steps of:

converting, with an analog/digital converter device, an angle-modulated receive signal into a digitized receive signal;

converting, with a digital frequency conversion device provided downstream of the analog/digital converter device, the digitized receive signal into a baseband;

selecting, with a digital channel selection device provided downstream of the digital frequency conversion device, a receive signal component of a given transmission channel from the digitized receive signal; and demodulating, with a digital demodulation device provided downstream of the digital channel selection device, the receive signal component selected by the digital channel selection device.

According to the invention, a digital channel selection is carried out. For this purpose, an angle-modulated receive signal is initially subjected to A/D conversion and transformed into the baseband. Digital channel selection is then carried out and, finally, digital demodulation and detection of the angle-modulated signal, for example a (G)FSK-modulated (Gaussian Frequency Shift Keying) signal.

Before the A/D conversion, a frequency conversion to a lower intermediate frequency can be carried out with subsequent low-pass filtering, a rough channel selection already being carried out through the use of the low-pass filtering.

Sigma-delta converters, operating at a specific oversampling rate, are preferably used as A/D converters. A digital complex multiplier can be used for frequency conversion into the baseband; this is implemented through the use of a stored table ("look-up table"), or the use of a "CORDIC" algorithm.

A series configuration including a plurality of alternately provided digital filters and undersampling stages is preferably used for the digital channel selection. This multi-stage architecture is essentially suitable for the digital cordless DECT, WDCT, Bluetooth, SWAP and WLAN communications systems due to their similar channel bandwidths in relation to the relevant symbol rates and the respective GFSK modulation which is used. A comb filter, a bireciprocal lattice wave digital filter, a further lattice wave digital filter and, finally, an equalizer are preferably used in this multi-stage digital channel selection architecture. The advantage of this architecture is that the undersampling or decimation required due to the sigma-delta converter which is preferably used for the A/D conversion is performed simultaneously with the channel selection.

A differential demodulator with a downstream sign comparator is preferably used as the digital demodulator and detector.

The receiving device according to the invention is essentially a digital configuration and therefore offers the generally known advantages of digital circuit technology, such as, in particular, no drift, no ageing, no temperature dependency and exact reproducibility. Furthermore, the digital receiving device can be configured as a programmable device, i.e. the characteristic of the channel selection filters can be adapted through the use of a suitable setting of the filter coefficients to the signal bandwidth present in a predefined cordless digital communications system.

Other features which are considered as characteristic for the invention are set forth in the appended claims.

Although the invention is illustrated and described herein as embodied in a receiving device for angle-modulated signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
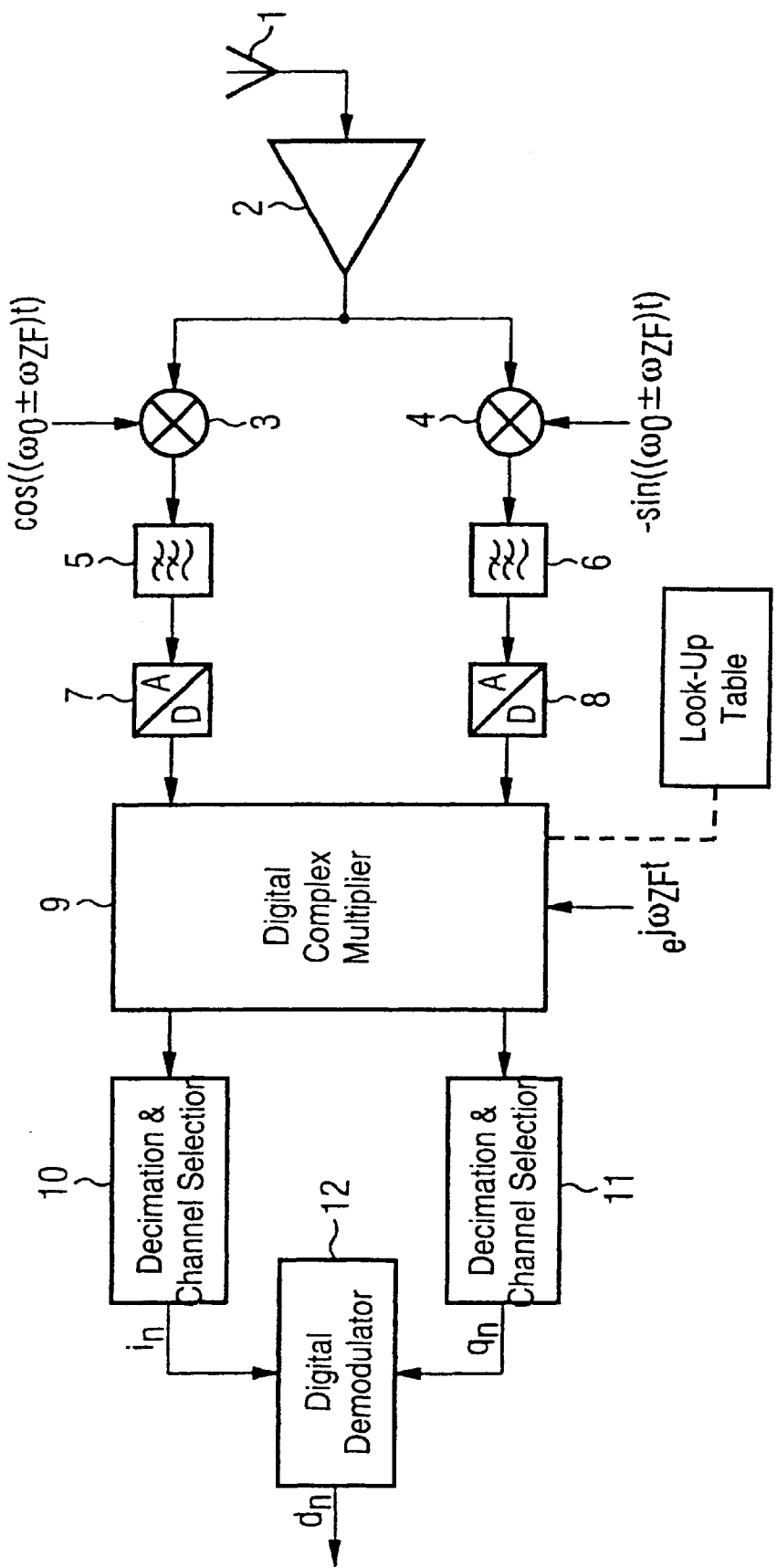
FIG. 1 is a simplified block diagram of the receiver according to the invention.

Referring now to the figures of the drawings in detail and first, particularly, to FIG. 1 thereof, there is shown the essential architecture of a digital receiver for digital communications systems, in particular cordless digital communications systems, according to a preferred embodiment of the present invention.

An angle-modulated signal, in particular an FSK-modulated signal, is received via a receiving antenna 1. This may involve, for example, a DECT, WDCT, Bluetooth, SWAP or WLAN signal, whereby GFSK (Gaussian Frequency Shift Keying) modulation is used in each case as the digital modulation type in these digital communications systems. GFSK modulation represents a special case of general FSK (Frequency Shift Keying), with suitable pulse formation in the baseband through the use of a Gaussian low-pass filter. Furthermore, in the aforementioned communications systems, the same BT (Bandwidth Time) ratio is used, with B·T=0.5, where B is the 3 dB limit frequency of the Gaussian low-pass filter and T is the bit period.

With the aid of an LNA amplifier 2 (Low Noise Amplifier), low-noise amplification of the receive signal is carried out before the receive signal is divided between two signal paths, whereby the upper signal path is a signal path for the in-phase or I-component, and the lower signal path is a signal path for the quadrature or Q-component of the receive-signal.

Frequency conversion to a lower intermediate frequency ($\omega_{ZF}$), which may correspond in particular to the symbol rate $1/T_s$ or the half channel spacing $\Delta f/2$ (in DECT systems, for example, $1/T_s$=1.152 MHz, and $\Delta f/2$=864 kHz applies), is carried out via frequency mixers 3 or 4. In order to suppress mirror frequencies, this frequency conversion is preferably carried out using quadrature signals $\cos((\omega_0 \pm \omega_{ZF}) t + \phi_0)$ or $-\sin((\omega_0 \pm \omega_{ZF})t + \phi_0)$, where $\omega_0$ designates the carrier frequency and $\phi_0$ the zero phase.

The I-component or Q-component of the receive signal thus lying at the intermediate frequency $\omega_{ZF}$ is supplied to an anti-aliasing low-pass filter 5 or 6, whereby a rough channel selection is already carried out through the use of this low-pass filtering.

The analog signals are then digitized with the aid of A/D converters 7 and 8. Sigma-delta converters of the order L, operating at a specific oversampling rate R, can be used in particular as A/D converters 7 and 8.

Following the digitization, the frequency conversion of the I-component and Q-component signals of the receive signal into the baseband (f=0) is carried out. The I-component and Q-component can be regarded respectively as the real component and imaginary component of the complex envelope I+jQ of the receive signal, so that the frequency conversion into the baseband is carried out using a digital complex multiplier 9 which multiplies the complex input signal formed by the I-component and Q-component by $e^{j\omega_{ZF}t}=\cos(\omega_{ZF}t)+j\sin(\omega_{ZF}t)$. This complex multiplication can be represented in particular by four real multiplications, whereby for example a look-up table, such as a ROM (Read Only Memory) table, can be used for this purpose, in which the individual multiplication results are stored. Use of the iterative CORDIC algorithm is similarly conceivable for carrying out the complex multiplication.

Digital channel selection is then carried out in each of the two signal paths with the aid of digital channel selection units 10 and 11. Since, as described, sigma-delta converters with oversampling are preferably used for the A/D converters 7 and 8, corresponding undersampling or decimation and filtering of the colored quantization noise is furthermore carried out in the units 10 and 11.

Figure 2:
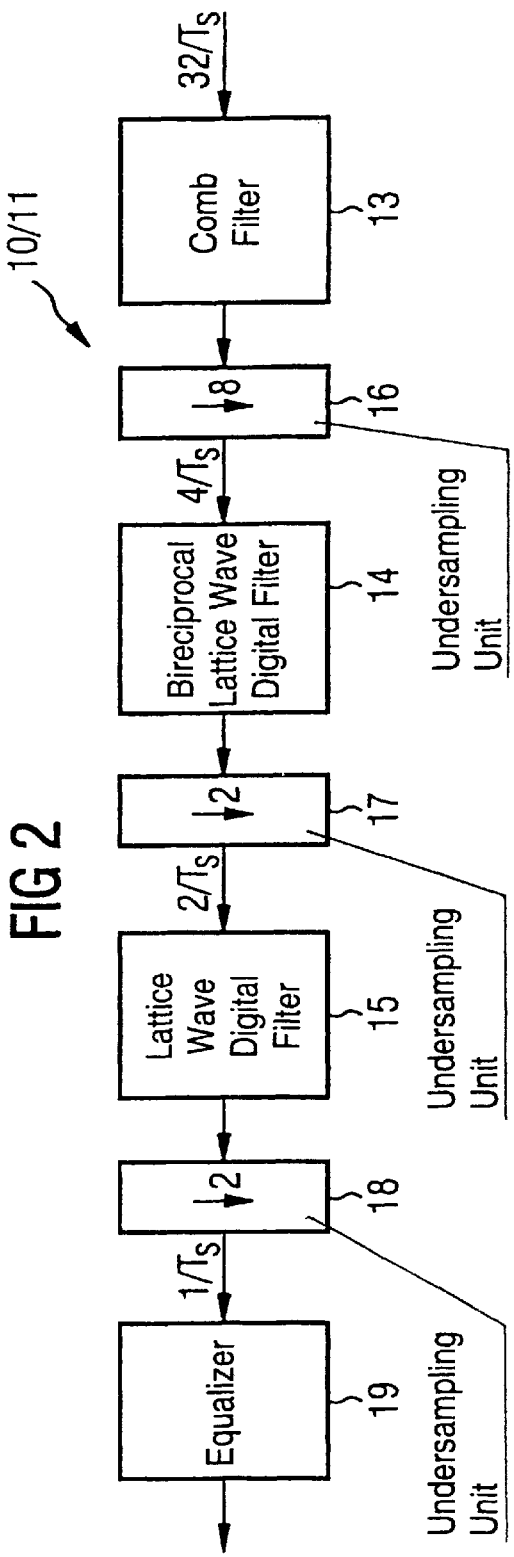
FIG. 2 is a block diagram of an exemplary implementation of the decimation and channel selection units shown in FIG. 1.

FIG. 2 shows a possible multi-stage architecture for the channel selection units 10 and 11, whereby it is assumed that the sigma-delta converters operate at an oversampling rate R=32. The multi-stage architecture shown is essentially suitable for the digital cordless DECT, WDCT, Bluetooth, SWAP and WLAN communications systems due to their similar channel bandwidths in relation to the symbol rates and the respective GFSK modulation with B·T=0.5 which is used.

The structure of this multi-stage channel selection and decimation architecture is such that, adapted to the order L of the sigma-delta converters 7 and 8, filtering with the aid of an order L+1 comb filter ($sinc^{L+1}$ filter) 13 is initially carried out. The sampling rate is reduced by the factor 8 to $4/T_s$ with a first undersampling stage 16. Following further filtering with a bireciprocal lattice wave digital filter 14, a further sampling rate reduction by the factor 2 is carried out through the use of a further undersampling stage 17. The final stage of the digital channel selection includes a third filtering with the aid of a further lattice wave digital filter 15 in combination with a third sampling rate reduction by the factor 2 to $1/T_s$ through the use of a third undersampling stage 18. Finally, equalization of the amplitude and group delay distortions caused by the analog pre-filtering and digital channel selection filtering is carried out by a low-order equalizer 19.

The I-symbols $i_n$ and Q-symbols $q_n$ of the selected transmission channel supplied in this way by the digital channel selection units 10 and 11 are supplied for demodulation and detection to a digital demodulator 12 operating at the symbol rate $1/T_s$.

Figure 3:
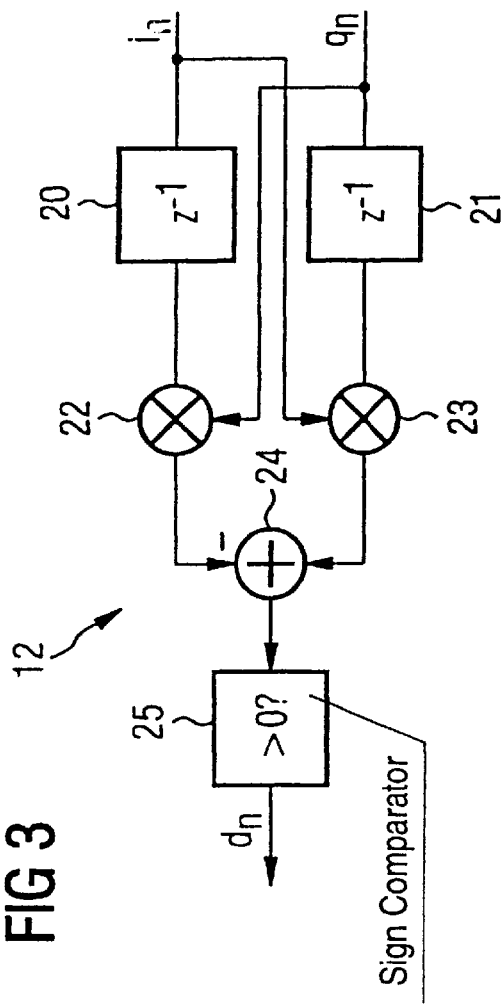
FIG. 3 is a block diagram of an exemplary implementation of a digital demodulator shown in FIG. 1.

As shown in FIG. 3, the digital demodulator 12 may be configured for demodulation and detection of (G)FSK-modulated signals in the form of a differential demodulator with real signal paths running according to FIG. 3, which have delay stages 20 and 21, multipliers 22 and 23 and an adder 24. A sign comparator 25, which evaluates the sign of the symbols supplied by the differential demodulator or its adder 24 and, dependent thereon, determines or detects the communications bits or message bits $d_n$, is connected to the differential demodulator.

We claim:

1. A receiving device for angle-modulated signals, comprising:
    an analog/digital converter device for converting an angle-modulated receive signal into a digitized receive signal;
    a digital frequency conversion device provided downstream of said analog/digital converter device for converting the digitized receive signal into a baseband;
    a digital channel selection device provided downstream of said digital frequency conversion device for selecting a receive signal component of a given transmission channel from the digitized receive signal;
    said analog/digital converter device, said digital frequency conversion device, and said digital channel selection device forming a first signal processing path and a second signal processing path;
    said digital channel selection device including a first digital channel selection unit assigned to said first signal processing path, and a second digital channel selection unit assigned to said second signal processing path;
    said first and second channel selection units each including a first digital comb filter, a second bireciprocal lattice wave digital filter, and a third lattice wave digital filter connected in series to one another; and
    a digital demodulation device provided downstream of said digital channel selection device for demodulating the receive signal component selected by said digital channel selection device.

2. The receiving device according to claim 1, including:
    an analog frequency conversion device provided upstream of said analog/digital converter device for converting the angle-modulated receive signal into an intermediate frequency band; and
    said digital frequency conversion device provided downstream of said analog/digital converter device being configured to convert the digitized receive signal from the intermediate frequency band into the baseband.

3. The receiving device according to claim 2, wherein said analog frequency conversion device converts the angle-modulated receive signal having a carrier frequency into the intermediate frequency band having an intermediate frequency lower than the carrier frequency of the angle-modulated receive signal.

4. The receiving device according to claim 2, wherein said analog frequency conversion device converts the angle-modulated receive signal having a symbol rate into the intermediate frequency band having an intermediate frequency corresponding to the symbol rate of the angle-modulated receive signal.

5. The receiving device according to claim 2, wherein said analog frequency conversion device converts the angle-modulated receive signal having a given channel spacing into the intermediate frequency band having an intermediate frequency corresponding to one half of the given channel spacing of the angle-modulated receive signal.

6. The receiving device according to claim 2, including a low-pass filter device provided between said analog frequency conversion device and said analog/digital converter device for filtering the angle-modulated receive signal having been converted into the intermediate frequency band.

7. The receiving device according to claim 6, wherein:
    said analog/digital converter device, said digital frequency conversion device, and said digital channel selection device form a first signal processing path for processing an in-phase component of the angle-modulated receive signal and a second signal processing path for processing a quadrature component of the angle-modulated receive signal;
    said analog frequency conversion device includes a first frequency mixer assigned to said first signal processing path, and a second frequency mixer assigned to said second signal processing path; and
    said low-pass filter device includes a first low-pass filter assigned to said first signal processing path, and a second low-pass filter assigned to said second signal processing path.

8. The receiving device according to claim 1, wherein:
    said analog/digital converter device, said digital frequency conversion device, and said digital channel selection device form said first signal processing path for processing an in-phase component of the angle-modulated receive signal and said second signal processing path for processing a quadrature component of the angle-modulated receive signal; and
    said digital demodulation device receives symbols output by said first signal processing path and symbols output by said second signal processing path for demodulation.

9. The receiving device according to claim 8, wherein:
    said analog/digital converter device includes a first analog/digital converter assigned to said first signal processing path, and a second analog/digital converter assigned to said second signal processing path; and said first analog/digital converter and said second analog/ digital converter are configured as sigma-delta converters operating with oversampling.

10. The receiving device according to claim 8, wherein said first and second channel selection units each have an output side and each have an equalizer on said output side.

11. The receiving device according to claim 8, wherein:
said digital demodulation device includes a differential demodulator and a sign comparator provided downstream from said differential demodulator; and
said differential demodulator outputs symbols, said sign comparator evaluates a sign of the symbols output by said differential demodulator in order to define a value of bits wherein the bits correspond to a selected one of the in-phase component of the receive signal and the quadrature component of the receive signal.

12. The receiving device according to claim 1, wherein said first and second channel selection units each have a multi-stage architecture with a plurality digital filters and with undersampling units provided alternately with said digital filters.

13. The receiving device according to claim 12, wherein said digital filters of said first and second digital channel selection units are programmable digital filters with settable filter coefficients.

14. The receiving device according to claim 1, wherein said first and second channel selection units each include said first digital filter, a first undersampling unit, said second digital filter, a second undersampling unit, said third digital filter and a third undersampling unit connected in series to one another.

15. The receiving device according to claim 14, wherein:
said analog/digital converter device includes a first analog/digital converter assigned to said first signal processing path, and a second analog/digital converter assigned to said second signal processing path;
said first analog/digital converter and said second analog/ digital converter are configured as sigma-delta converters having a first filter order; and
said first digital filter of said first and second digital channel selection units has a second filter order such that the second filter order is higher by a value of 1 than the first filter order.

16. The receiving device according to claim 15, wherein:
said first and second analog/digital converters operate with a 32-fold oversampling;
said first undersampling unit of said first and second channel selection units operates with an 8-fold undersampling; and
said second and third undersampling units of said first and second channel selection units each operate with a 2-fold undersampling.

17. The receiving device according to claim 1, wherein said digital frequency conversion device is a digital complex multiplier.

18. The receiving device according to claim 17, wherein said digital complex multiplier is configured to access information stored in a table for performing a complex multiplication required for a frequency conversion into the baseband.

19. The receiving device according to claim 17, wherein said digital complex multiplier is configured to apply a CORDIC algorithm for performing a complex multiplication required for a frequency conversion into the baseband.

20. In a digital cordless communications system, a receiving device for angle-modulated signals, comprising:
an analog/digital converter device for converting an angle-modulated receive signal into a digitized receive signal;
a digital frequency conversion device provided downstream of said analog/digital converter device for converting the digitized receive signal into a baseband;
a digital channel selection device provided downstream of said digital frequency conversion device for selecting a receive signal component of a given transmission channel from the digitized receive signal;
said analog/digital converter device, said digital frequency conversion device, and said digital channel selection device forming a first signal processing path and a second signal processing path;
said digital channel selection device including a first digital channel selection unit assigned to said first signal processing path, and a second digital channel selection unit assigned to said second signal processing path;
said first and second channel selection units each including a first digital comb filter, a second bireciprocal lattice wave digital filter, and a third lattice wave digital filter connected in series to one another; and
a digital demodulation device provided downstream of said digital channel selection device for demodulating the receive signal component selected by said digital channel selection device.

21. The receiving device according to claim 20, wherein the digital cordless communications system is configured to transmit GFSK-modulated signals and said receiving device is configured to receive GFSK-modulated signals.

* * * * *